United States Patent [19]
Bruckert et al.

[11] Patent Number: 5,809,020
[45] Date of Patent: Sep. 15, 1998

[54] METHOD FOR ADAPTIVELY ADJUSTING WEIGHTING COEFFICIENTS IN A CDMA RADIO RECEIVER

[75] Inventors: Eugene J. Bruckert, Arlington Heights; Fuyun Ling, Hoffman Estates, both of Ill.

[73] Assignee: Motorola, Inc., Schaumburg, Ill.

[21] Appl. No.: 617,006

[22] Filed: Mar. 18, 1996

[51] Int. Cl.$^6$ .................................................. H04B 7/216
[52] U.S. Cl. ........................... 370/335; 375/200; 370/342
[58] Field of Search .................................... 370/441, 320, 370/335, 342, 480, 491, 350; 375/200, 206, 229, 231, 346, 349; 455/52.1, 65

[56] References Cited

U.S. PATENT DOCUMENTS

| | | | |
|---|---|---|---|
| 5,140,615 | 8/1992 | Jasper et al. | 370/349 |
| 5,237,586 | 8/1993 | Bottomley | 370/342 |
| 5,442,627 | 8/1995 | Viterbi et al. | 370/342 |
| 5,506,861 | 4/1996 | Bottomley | 370/441 |
| 5,544,167 | 8/1996 | Lucas et al. | 370/342 |
| 5,572,552 | 11/1996 | Dent et al. | 375/324 |

OTHER PUBLICATIONS

*CDMA:Principles of Spread Spectrum Communication,* by Andrew J. Viterbi, Addison–Wesley Publishing Company, pp. 86–93, 1995.
*Signal Acquisition and Tracking With Adaptive Arrays in the Digital Motile Radio System IS–54 With Flat Fading,* by Jack H. Winters, Senior Member, IEEE Transactions on Vehicular Technology, vol. 42, No. 4, Nov. 1993, pp. 377–384.

*Primary Examiner*—Chau Nguyen
*Attorney, Agent, or Firm*—Kevin D. Kaschke

[57] ABSTRACT

A method (300) for adaptively adjusting weighting coefficients (188, 190, 192) in a code division multiple access (CDMA) radio receiver (100). A representation (172) of a desired RF signal (166) is received (108, 124, 127). A plurality of pilot signals (178, 182, 186) are generated responsive to the representation (172) of a desired RF signal (166). Each of a plurality of weighting coefficients (188, 190, 192) is determined responsive to more than one of the plurality of pilot signals (178, 182, 186).

20 Claims, 3 Drawing Sheets

METHOD FOR ADAPTIVELY ADJUSTING WEIGHTING COEFFICIENTS IN A CDMA RADIO RECEIVER

CROSS-REFERENCE TO RELATED APPLICATIONS

The present application is related to application Ser. No. 08/617,462, entitled "Method For Determining Weighting Coefficients In A Cdma Radio Receiver", filed on the same date herewith and assigned to the assignee of the present invention.

FIELD OF THE INVENTION

The present invention relates generally to radio receivers and, more particularly, method for adaptively adjusting weighting coefficients in a CDMA radio receiver.

BACKGROUND OF THE INVENTION

Radio systems provide users of radio subscriber units with wireless communications. A particular type of radio system is a cellular radiotelephone system. A particular type of radio subscriber unit is a cellular radiotelephone subscriber unit, sometimes referred to as a mobile station. Cellular radiotelephone systems generally include a switch controller coupled to a public switched telephone network (PSTN) and a plurality of base stations. Each of the plurality of base stations generally defines a geographic region proximate to the base station to produce coverage areas. One or more mobile stations communicate with a base station that facilitates a call between the mobile station and the public switched telephone network. A description of a cellular radiotelephone system is described in the book "Mobile Cellular Communications Systems" by Dr. William C. Y. Lee, 1989.

Some mobile stations have space diversity to improve the reception of communication signals sent from the base station. Diversity employs equipment redundancy or duplication to achieve an improvement in receiver performance under multipath fading conditions. Space diversity, in particular, employs two or more antennas that are physically spaced apart by a distance related to the wavelength. In a space diversity system, a transmitted signal travels by slightly different paths from the transmitter to the two antennas at the receiver. In addition, there may be reflected paths, where the transmitted signal received by each antenna has also traveled by different paths from the transmitter. Experience has shown that when the reflected path causes fading by interference with the transmitted signal, the two received signals may not be simultaneously affected to the same extent by the presence of multipath fading, because of the different paths. Although the path from the transmitter to one of the two antennas may cause phase cancellation of the transmitted and reflected path waves, it is less probable that multiple paths to the other antenna will cause phase cancellation at the same time. The probability that the two antennas are receiving exactly the same signal is called a correlation factor.

Known space diversity systems include switched antenna diversity (SAD), selection diversity (SD) and maximal ratio combining diversity (MRCD). Each diversity system includes a controller having an algorithm programmed therein for controlling the diversity system. A detailed comparison of these three diversity systems is described in "On the Optimization of Simple Switched Diversity Receivers" by Zdunek et al, 1978 IEEE Canadian Conference on Communications and Power, Montreal, Canada and "Performance and Optimization of Switched Diversity Receivers" by Zdunek et al, IEEE Transactions on Communications, December 1979. A brief description of these three diversity systems is now provided.

SAD employs two antennas coupled to a single receiver through a single pole, double throw radio frequency (RF) switch. A controller samples the signal received from each antenna to couple only one of the two antennas to the receiver at a time.

SD employs two antennas and two receivers, wherein each antenna is coupled to its own receiver. The receiver with the highest baseband signal to noise ratio (SNR) is selected to be the demodulated signal. SD provides improved performance over SAD because the signals produced by the receivers can be monitored more often than with SAD and suffer fewer switching transients. However, a weakness of both SAD and SD is that only one antenna is used at any instant in time, while the other is disregarded.

MRCD also employs two antennas and two receivers, wherein each antenna is coupled to its own receiver. MRCD seeks to exploit the signals from each antenna by weighting each signal in proportion to their SNRs and then summing them. Accordingly, the individual signals in each diversity branch are cophased and combined, exploiting all the received signals, even those with poor SNRs. However a disadvantage of MRCD is that MRCD is more difficult and complicated to implement than SAD or SD.

A particular type of cellular radiotelephone system employs spread spectrum signaling. Spread spectrum can be broadly defined as a mechanism by which the bandwidth occupied by a transmitted signal is much greater than the bandwidth required by a baseband information signal. Two categories of spread spectrum communications are direct sequence spread spectrum (DSSS) and frequency-hopping spread spectrum (FHSS). The essence of the two techniques is to spread the transmitted power of each user over such a wide bandwidth (1–50 Mhz) that the power per unit bandwidth, in watts per hertz, is very small.

Frequency-hopping systems achieve their processing gain by avoiding interference, whereas the direct sequence systems use an interference attenuation technique. For DSSS, the objective of the receiver is to pick out the transmitted signal from a wide received bandwidth in which the signal is below the background noise level. The receiver must know the carrier frequency signal, type of modulation, pseudorandom noise code rate, and phase of the code in order to do this, since signal to noise ratios are typically minus 15 to 30 dB. Determining the phase of the code is the most difficult. The receiver uses a process known as synchronization to determine the starting point of the code from the received signal in order to despread the required signal while spreading all unwanted signals.

The DSSS technique acquires superior noise performance, compared to frequency hopping, at the expense of increased system complexity. The spectrum of a signal can be most easily spread by multiplying it with a wideband pseudorandom code-generated signal. It is essential that the spreading signal be precisely known so that the receiver can demodulate (i.e. despread) the signal. Furthermore, it must lock onto and track the correct phase of the received signal within one chip time (i.e. a partial or subinteger bit period). At the receiving end, a serial search circuit is used. There are two feedback loops, one for locking onto the correct code phase and the other for tracking the carrier. For code phase locking, the code clock and carrier frequency generator in the receiver are adjusted so that the locally generated code moves back and forth in time relative to the incoming received code. At the point which produces a maximum at the correlator output, the two signals are synchronized, meaning that the correct code phase has been acquired. The second loop (carrier tracking loop) then tracks the phase and frequency of the carrier to ensure phase lock is maintained.

A cellular radiotelephone system using DSSS is commonly known as a Direct Sequence Code Division Multiple Access (DS-CDMA) system. Individual users in the system use the same RF frequency but are separated by the use of individual spreading codes.

In a DS-CDMA system a forward channel is defined as a communication path from the base station to the mobile station, and a reverse channel is defined as a communication path from the mobile station to the base station. The DS-CDMA forward channel performance is poor in thermal noise limited conditions, at slow mobile speeds, on the order of 0–20 km/hr and in multiple coverage regions where soft handoff is likely. Hence, the forward channel typically limits system capacity.

The forward channel operation of DS-CDMA may be greatly improved by adding rake fingers to the receiver of the mobile station. The performance improvement provided by these extra rake fingers can approach the performance of MRCD by optimally exploiting resolvable delay spread and soft handoff. Each rake finger generates a demodulated signal and a pilot signal. Typically, the mobile station measures a total receive power (Io) in the intermediate frequency (IF) bandwidth and a received pilot power per chip (Ec) for the traffic channel being demodulated for each finger. A ratio of Ec/Io is determined for each finger and treated as the signal to noise ratio of the associated traffic channel. This ratio is used to determine a weighting function to weight the corresponding demodulated traffic signal from each rake finger. The weighted and demodulated signals from all the rake fingers are combined and decoded. Since the signal received by each rake finger is a copy of the transmitted signal travelling through a different propagation path, the combining of rake finger outputs can also be treated as a type of diversity. The diversity gain of the receiver can be further improved by using multiple antennas. Typically, two antennas may be employed. In such a receiver, one or more fingers is connected to each antenna. The outputs of all the fingers are combined similarly to the receiver with a single antenna.

However, there are still two problems with this method. The total signal power (Io) is not proportional to the total noise power because the pilot signal and portions of the received signals from the same base station are orthogonal to the desired signal. Further, relationship between the ratios (Ec/Io) from two cells may not reflect the relationship between the corresponding traffic channel signal-to-noise ratios.

Unfortunately, field tests have measured only a small percentage of time where there is significant resolvable delay spread and both theory and simulations have shown soft handoff enhancement to be over a very limited amplitude range of the signal. As a result, the forward channel suffers performance degradation with respect to the reverse channel which has antenna diversity and takes full advantage of all its fingers.

Not only is there reduced range in the forward channel but the quality of the channel is poorer because frame error rate (FER) occurrences are correlated. Whereas reverse channel errors are much more random in time resulting in higher quality speech sound. The fundamental reason for the correlation is the character of the fading channel and the sluggishness of the forward channel power control loop.

Even when the subscriber unit receiver employs more than one antenna to achieve antenna diversity, a problem of the weighting coefficient determination of the prior art is that there are times when adding the co-phased and weighted signals, each of which has an individually maximized signal to noise ratio (SNR), does not maximize the combined signal-to-noise ratio.

Accordingly, there is a need for a method for determining weighting coefficients in a CDMA mobile station that overcomes the disadvantages of the prior art and works well in DSSS systems.

DETAILED DESCRIPTION OF THE PREFERRED EMBODIMENTS

Figure 1:
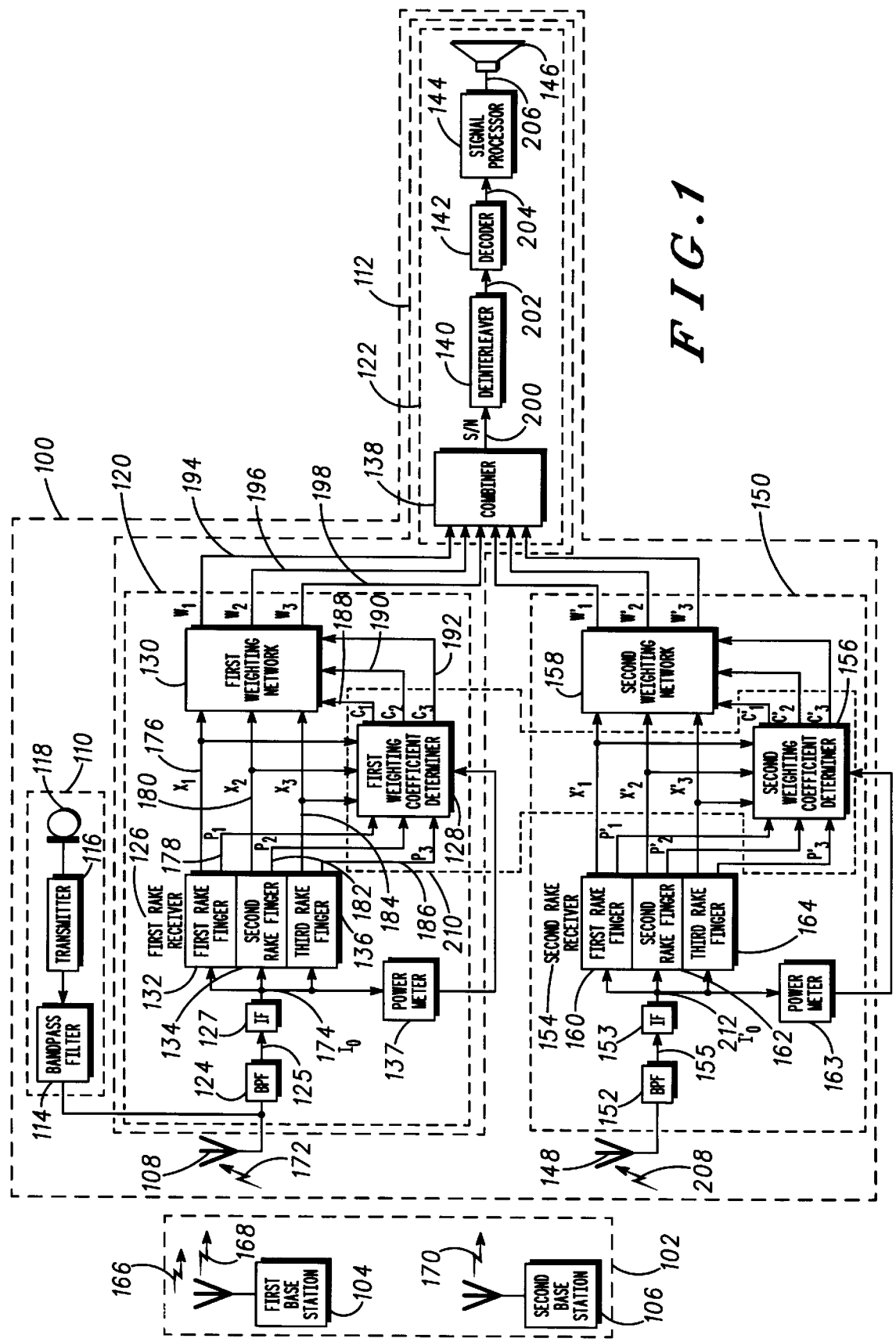
FIG. 1 illustrates a block diagram of a mobile station for use in a radio system.

FIG. 1 illustrates a block diagram of a mobile station 100 for use in a radio system 102. The radio system 102 generally includes a plurality of base stations including a first base station 104 and a second base station 106, for example. The mobile station 100 generally includes a first antenna 108, a transmitter section 110 and a receiver section 112. The transmitter section 110 includes a bandpass filter 114, a transmitter 116 and a microphone 118. The receiver section 112 includes a first front end receiver section 120 and a back end receiver section 122. The first front end receiver section 120 includes a bandpass filter 124, an intermediate frequency (IF) converter 127, a first power meter 137, a first rake receiver 126, a first weighting coefficient determiner 128 and a first weighting network 130. The first rake receiver 126 includes a first rake finger 132, a second rake finger 134 and a third rake finger 136. The back end receiver section 122 includes a combiner 138, a deinterleaver 140, a decoder 142, a signal processor 144 and a speaker 146. The mobile station 100 may also include a second antenna 148 and a second receiver front end section 150. The second receiver front end section 150 includes a bandpass filter 152, an intermediate frequency (IF) converter 153, a second power meter 163, a second rake receiver 154, a second weighting coefficient determiner 156 and a second weighting network 158. The second rake receiver 154 includes a first rake finger 160, a second rake finger 162 and a third rake fingers 164.

In the radio system 102, the first base station 104 transmits a first desired radio frequency (RF) signal 166 to the mobile station 100 and the second base station 106 transmits a second desired radio frequency (RF) signal 170 to the mobile station 100. Desired RF signal 168 is a replica of the desired RF signal 166 but delayed and attenuated due to reflection or the like. Desired RF signal 170 is the same as the desired RF signal 166 but from the second base station 106 for a handoff or the like. It is generally known that the mobile station 102 needs to be within a coverage area provided by a base station to provide effective communication therebetween. Note that there may be more than two base stations and more than three desired RF signals in a typical radio system, but the radio system 102 of FIG. 1 is adequate to describe the present invention. The two base stations generally represent a handoff condition of the mobile station 100 between the first base station 104 and the second base station 106.

In the mobile station 100, the first antenna 108 is coupled to the transmitter section 110 and the receiver section 112. The transmitter section 110 transmits signals from the antenna 108 and the receiver section 112 receives signals from the antenna 108.

In the receiver section 112, the first antenna receives a first representation 172 of the desired RF signal 166, 168 and/or 170. The antenna 108 is coupled to the bandpass filter 124. The bandpass filter 124 filters the first representation of the desired RF signal 172 over a predetermined bandwidth to produce a filtered signal at line 125. In the preferred embodiment, the predetermined bandwidth is 1.25 MHz.

The IF converter 127 converts the filtered signal at line 125 from a radio frequency to an intermediate frequency at line 174 as is known in the art. An example of the IF converter 127 is generally disclosed in the book "Digital Communications" by John Proakis, McGraw-Hill, 1989, or "Theory of Spread Spectrum Communications—A Tutorial" by Raymond L. Pickhotz et al., IEEE Transactions on Communications, vol. com-30, pp 855–884, 1992. Many functions of the IF converter 127 may be implemented in discrete parts or as an integrated circuit (IC) as is well known in the art.

The power meter 137 measures the total received power Io at the output of the IF converter 127. The measured total received power Io is sent to the first weighting coefficient determiner 128.

The first rake receiver 126 is coupled to the IF converter 127 and has a first plurality of rake fingers 132, 134 and 136 including the first rake finger 132, the second rake finger 134 and the third rake finger 136. In the preferred embodiment, there are three rake fingers. However, any number of rake fingers may be used. The first rake finger 132 generates a received signal, x1, at line 176 and a pilot signal, p1, at line 178. The second rake finger 134 generates a received signal, x2, at line 180 and a pilot signal, p2, at line 182. The third rake finger 136 generates a received signal, x3, at line 184 and a pilot signal, p3, at line 186. The received signals x1, x2 and x3, which are complex numbers, are demodulated signals indicative of the first representation 172 of the desired RF signal 166, 168 and/or 170. The received signals x1, x2 and x3 are also known as data signals, traffic channel signals and traffic data. The pilot signals p1, p2 and p3, which are also complex numbers, correspond to the received signals x1, x2 and x3. The operation of the first rake receiver 126 to produce the received signals x1, x2 and x3 and the pilot signals p1, p2 and p3 is well known in the art, such as described in *CDMA—Principles of Spread Spectrum Communications*, by A. J. Viterbi, published by Addison-Wesley Publishing Company in 1995.

The pilot signals p1, p2 and p3, the data signals x1, x2, and x3, and the total received signal power Io are coupled to the first weighting coefficient determiner 128. The first weighting coefficient determiner 128 generates a first plurality of complex weighting coefficients c1 at line 188, c2 at line 190 and c3 at line 192. The first plurality of complex weighting coefficients c1, c2 and c3 correspond to the received signals x1, x2 and x3, respectively. The first plurality of complex weighting coefficients c1, c2 and c3 are determined using a first method described with FIG. 2 and a second method described with FIG. 3.

The first weighting network 130 is coupled to the first rake receiver 126 and the first weighting coefficient determiner 128. The first weighting network 130 weights the received signals x1, x2 and x3 responsive to the first plurality of complex weighting coefficients c1, c2 and c3, respectively, to generate a first plurality of complex weighted received signals w1 at line 194, w2 at line 196 and w3 at line 198, respectively. The received signal x1 is weighted by weighting coefficient c1 to generate weighted receive signal w1. The received signal x2 is weighted by weighting coefficient c2 to generate weighted receive signal w2. The received signal x3 is weighted by weighting coefficient c3 to generate weighted receive signal w3. The operation of the first weighting network 130 is to multiply each $x_i$, $i=1, 2, \ldots, n$, by the complex conjugate of the corresponding weighting coefficient $c_i$, $i=1, 2, \ldots, n$. The resulting weighted receive signal $w_i$, $i=1, 2, \ldots n$, is the real part of the i-th product.

The combiner 138 is coupled to the first weighting network 130 and combines first plurality of weighted received signals w1, w2 and w3 to produce a combined signal at line 200. Note that the first weighting coefficient determiner 128 optimizes the first plurality of weighting coefficients c1, c2 and c3, according to the flowcharts in FIGS. 2 and 3, in order to maximize the signal to noise ratio (S/N) of the combined signal at line 200. The deinterleaver 140 is coupled to the combiner 138 and adapted to deinterleave the combined signal at line 200 to produce a deinterleaved signal 202. The decoder 142 is coupled to the deinterleaver 140 and adapted to decode the deinterleaved signal to produce a decoded signal at line 204. The signal processor 144 is coupled to the decoder 142 and is adapted to process the decoded signal to produce a recovered signal at line 206. The speaker 146 receives the recovered signal at line 206 and converts the recovered signal at line 206 into an acoustic signal. The operation of the combiner 138, the deinterleaver 140, the decoder 142, the signal processor 144 and the speaker 146 are each well known in the art.

In the preferred embodiment, the first rake receiver 126 (including a despread operation, I-Q demodulation, and synchronization), the first weighting network 130, the combiner 138, the deinterleaver 140, the decoder 142 are embodied within an application specific integrated circuit (ASIC) as described in "CDMA Mobile Station Modem ASIC", *Proceedings of the IEEE* 1992 Custom Integrated Circuits Conference, section 10.2, pages 1–5; and "The CDMA Digital Cellular System an ASIC Overview", *Proceedings of the IEEE* 1992 Custom Integrated Circuits Conference, section 10.1, pages 1–7. In the preferred embodiment, the first weighting coefficient determiner 128 and the signal processor 144 is generally a microcomputer such as a microprocessor or a digital signal processor (DSP). The microcomputer may be a MC68332 microcontroller and the DSP may be a MC56156 DSP; both parts being manufactured and available from Motorola, Inc.

The mobile station 100 preferably has two antennas 108 and 148. The second receiver front end section 150 receives via the second antenna 148 a second representation 208 of the desired RF signal 166, 168 and/or 170. The second receiver front end section 150 provides space diversity operation for the radio subscriber unit 100. The operation of the second receiver front end section 150 is the same as the operation of the first receiver front end section 120. Note that different reference numerals are designated for like elements and signal lines and prime marks are designated for like signal references. Therefore, the first weighting coefficient c'1, c'2 and c'3 of the second weighting coefficient determiner 156 are determined using the first method described with FIG. 2 and the second method described with FIG. 3. The first weighting coefficient determiner 128 and the second weighting coefficient determiner 156 define a combined coefficient determiner 210. The combined coefficient determiner 210 can also determine the weighting coefficients c1, c2, and c3 and c'1, c'2 and c'3 of each front end section 120 and 150, respectively, responsive to at least one of the pilot signals p1, p2 and p3 and p'1, p'2 and p'3, at least one of the data signals x1, x2 and x3 and x'1, x'2 and x'3 and at least one of the first and second total received signal power Io and I'o from both front end sections 120 and 150.

The first representation 172 of the desired RF signal 166, 168 and/or 170 and the second representation 208 of the desired RF signal 166, 168 and/or 170 provide identical information to the mobile station 100. However, because of the spatial relationship of the first antenna 108 and the second antenna 148, the desired RF signal received at one antenna may be delayed and/or attenuated with respect to the desired RF signal received at the other antenna. The diversity operation of the first receiver front end section 120 and the second receiver front end section 150 takes advantage of these differences in order to improve the reception of the mobile station 100.

More than two antennas may be incorporated into a diversity receiver apparatus in the mobile station 100 as is well known to those skilled in the art. The first antenna 108 and the second antenna 148 generally include any antenna that can receive and/or transmit RF signals. In the preferred embodiment, the first antenna 108 and the second antenna 148 are dipole antennas having a wave length of one-half lamda. The proper location, spacing, orientation, etc., of the first antenna 108 and the second antenna 148, within the radio subscriber unit 102 is well known to one of ordinary skill in the art. The second antenna 148 may be located in a flap element of the mobile station 100 as is well known in the art.

In the preferred embodiment, the first antenna 108 is considered the primary antenna because it is coupled to both the first receiver front end section 120 and the transmitter section 110. The second antenna 148 is considered an auxiliary (or alternate) antenna that enables the diversity receiver function. The transmitter section 110 is not coupled to the second antenna 148.

The radio system 100 generally describes any communication system operating over RF channels. Radio systems intended to be included within the scope of the present invention include, without limitation, cellular radiotelephone communication systems, two-way radio communication systems, and personal communication systems (PCS).

In the preferred embodiment, the radio system 100 is a cellular radiotelephone communication system. In the preferred embodiment, the cellular radiotelephone communication system is a Direct Sequence—Code Division Multiple Access (DS-CDMA) cellular radiotelephone communication system. The standard for this system is disclosed in TIA/EIA/IS95, Mobile Station-Base Station Compatibility Standard for Dual-Mode Wide Band Spread Spectrum Cellular System, published July 1993 (hereinafter referred to as the "IS-95 Standard"), herein incorporated by reference.

In the preferred embodiment, the mobile station 100 is a DS-CDMA radio subscriber unit designed to be compatible with the DS-CDMA cellular radiotelephone system as described in the aforementioned IS-95 Standard. The mobile station 100 may take many forms that are well known in the art, such as, for example, a vehicular mounted unit, a portable unit, or a transportable unit.

In the IS-95 standard, a nomenclature is given for the naming of data elements within the mobile station. Table 1 below illustrates the timing relationships between various data elements in the CDMA mobile station 100.

TABLE 1

| element | rate (seconds) | rate (symbols) | comments |
| --- | --- | --- | --- |
| chip | 1.2288 Mchip/s | | A Tx bit is called a "chip" |
| symbol | 19.2 ksym/s | 64 chips/symbol | Intermediate stage bits are "symbols" |
| bit | 9.6 kbit/s | 2 symbols/bit | Convolutional coder is rate 1/2 |
| PCG | 800 PCG/s | 24 symbols/PCG | Power Control Group |
| frame | 50 Hz | 192 bits/frame | Primary data is a "bit" |

DS-CDMA is a technique for spread-spectrum multiple-access digital communications that creates channels through the use of unique code sequences. DS-CDMA signals can be and are received in the presence of high levels of interference. The practical limit of signal reception depends on the channel conditions, but DS-CDMA reception described in the aforementioned IS-95 Standard can take place in the presence of interference that is 18 dB larger than the signal for a static channel. Typically the system operates with a lower level of interference and dynamic channel conditions.

The DS-CDMA cellular radiotelephone communication system may be divided into sectors or coverage areas as is well know in the art. In a DS-CDMA system the frequencies for communication are reused in every sector of every cell, and most of the interference on a given frequency as seen by the mobile station 100 is from cells outside that which the mobile station 100 resides.

A DS-CDMA base station transceiver communicates with the mobile station 100 with a signal having a basic data rate of 9600 bits/s. The signal is them spread to a transmitted bit rate, or chip rate, of 1.2288 Mhz. Spreading consists a applying digital codes to the data bits that increase the data rate while adding redundancy to the DS-CDMA system. The chips of all the users in that cell are then added to form a composite digital signal. The composite digital signal is then transmitted using a form of quadrature phase shift keying (QPSK) modulation that has been filtered to limit the bandwidth of the signal.

When a transmitted signal is received by the mobile station 100, the coding is removed from the desired signal, returning it to a data rate of 9600 bit/s. When the coding is applied to the other users' codes, there is no despreading; the received signal maintains the 1.2288 Mhz band width. The ratio of transmitted bits or chips to data bits is the coding gain. Coding gain for an DS-CDMA system according to the IS-95 Standard is 128, or 21 dB. Because of this coding gain of 21 dB, interference of up to 18 dB above the signal level (3 dB below the signal strength after coding gain) can be tolerated for a static channel.

Figure 2:
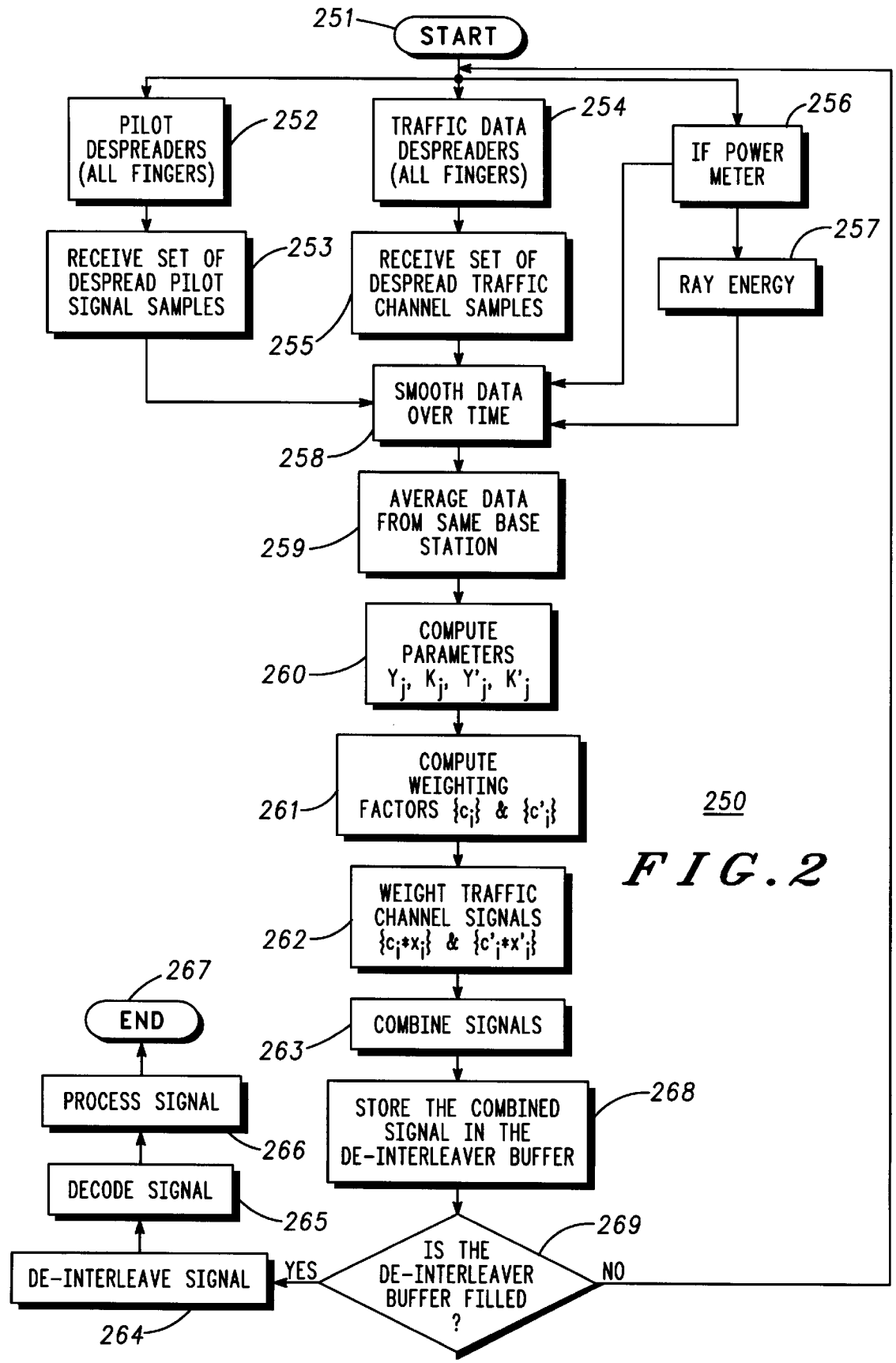
FIG. 2 illustrates a flowchart describing a first embodiment for determining weighting coefficients in the mobile station of FIG. 1.

FIG. 2 illustrates a flowchart 250 describing a first embodiment for determining the first plurality of weighting coefficients c1, c2 and c3 in the mobile station 100 of FIG. 1.

At step 251 the method begins.

At step 252, all pilot signals of the rake fingers are despread by the first rake receiver 126 and the second rake receiver 154 of FIG. 1.

At step 253, the pilot signals are received by the first weighting coefficient determiner 128 and the second weighting coefficient determiner 156 of FIG. 1.

At step 254, all traffic data signals of the rake fingers are despread by the first rake receiver 126 and the second rake receiver 154 of FIG. 1.

At step 255, the despread traffic data are received by the first weighting coefficient determiner 128 and the second weighting coefficient determiner 156 of FIG. 1.

At step 256, the total received signal powers Io and I'o are determined by reading the power at the output of the IF filters 127 and 153, respectively. This is accomplished by power meters 137 and 163, respectively.

At step 257, the ray energy is determined from the total received signal power (Io and I'o) by two fast Hadamard transformers, not shown, but located in the first weighting coefficient determiner 128 and the second weighting coefficient determiner 156, respectively.

At step 258, the signals received from steps 253, 255, 256 and 257 are smoothed over time by the first weighting coefficient determiner 128 and the second weighting coefficient determiner 156 of FIG. 1. The purpose of this step is to reduce the impairments from radio channel noise, receiver noise and signal rate variations.

At step 259, the smoothed signals from the same base station are averaged by the first weighting coefficient determiner 128 and the second weighting coefficient determiner 156 of FIG. 1. The purpose of this step is to further reduce the impairments from radio channel noise, receiver noise and signal rate variations. Data from like base stations in both weighting coefficient determiners 128 and 156 are preferably combined in this step (e.g., the smoothed pilot signals p3 and p'3 from base station 106 are averaged to produce an estimate of the pilot signal).

At step 260, the parameters Yj and Kj are computed by the first weighting coefficient determiner 128 and the second weighting coefficient determiner 156 of FIG. 1.

At step 261, the first plurality of complex weighting coefficients c1, c2 and c3 are determined using the following equations:

$$c1 = \frac{Y_{104} \times p1^*}{I_0 - K_{104} \times E[|p1|^2]} ;$$

$$c2 = \frac{Y_{104} \times p2^*}{I_0 - K_{104} \times E[|p2|^2]} ;$$

and $$c3 = \frac{Y_{106} \times p3^*}{I_0 - K_{106} \times E[|p3|^2]} ;$$

where:

the symbol (*) denotes the complex conjugate operation, $E[|pi|^2]$ is the power of pi, Io is the total received signal power after the IF converter 127, and Yj, Kj are constants related to the power distribution of the signal from the base station j, which is being demodulated by the i-th finger.

Specifically, the factor Yj is determined by:

$$Y_j = \frac{\text{power of traffic signal of interest transmitted by base station } j}{\text{power of pilot signal transmitted by base station } j} .$$

This value is normalized to full rate traffic channel power.

Kj may be predetermined, as shown below, or determined in real time. The power of the pilot pi and the pilot of the traffic signal xi can be computed by averaging a plurality of squared magnitude of the corresponding pilot and signal samples as shown below. Ideally, Kj should be:

$$K_j = \frac{\text{power of all signals transmitted by base station } j}{\text{power of pilot signal transmitted by base station } j} .$$

The factor Kj may be set to be a nominal value for the ratio. Since the pilot power is typically 20% of the total power, a choice of K=5 would be acceptable. Alternatively, the total transmit power may be estimated by summing the outputs of a fast Hadamard transform of the signal 174 or 212 at the sampling phase of the strongest pilot and smoothing this sum and pilot over a number of frames. Then, Kj would be equated to the ratio of the two. Again, input from multiple rays, both antennas and multiple frames may be used for more accurate estimation.

The total received signal powers Io and I'o are determined by reading the power at the output of the IF filters 127 and 153, respectively. This signal may be averaged over one or more frames. In a practical receiver implementation, an automatic gain control (AGC) circuit always exists, which keeps the total receiver power at a constant level before being converted by the analog to digital converter (ADC) to digital samples. As a result, Io is a constant depending on the operating point of the AGC and the ADC, which are known to one skilled in the art.

At step 261, the second plurality of weighting coefficients c'1, c'2 and c'3 are calculated in a like manner to the first plurality of weighting coefficients c1, c2 and c3 as follows.

$$c'1 = \frac{Y_{104} \times p'1^*}{I_0' - K_{104} \times E[|p'1|^2]} ;$$

$$c'2 = \frac{Y_{104} \times p'2^*}{I_0' - K_{104} \times E[|p'2|^2]} ;$$

and $$c'3 = \frac{Y_{106} \times p'3^*}{I_0' - K_{106} \times E[|p'3|^2]} .$$

Note that in the prior art, Yj is always one, and Kj is always zero to yield weighting coefficients c1=p1*/Io, c2=p2*/Io and c3=p3*/Io. The first embodiment improves on the prior art by adjusting the weighting factors to take into consideration actual conditions. The signals transmitted by different base stations may not be able to maintain constant relationships among the pilot signal, traffic channel signal and total signal powers. Indeed, network optimization is often associated with changing these relationships as conditions require. Also, the signals from different base stations are typically received at unequal power levels. Prior art weighting by not taking the above conditions into account tends to give equal weighting to all fingers with the only variable being the pilot energy pi to weight the various signals at combiner 138. On the other hand, the preferred embodiment does take into account the transmission and channel conditions thereby providing a more accurate weighting to the signals input to combiner 138. This can result in up to 2.0 dB improved performance during handoff.

Typically, 2 to 4 fingers per port are used and they may be shared to have an imbalance configuration (e. g.: at times, 4 fingers at one port and 2 at the other). The numerator of the weighting factor ci transforms the instantaneous pilot channel energy measure to a traffic channel energy measure (i.e.: instantaneous traffic channel energy=YjE[|pi|$^2$]). Rather than calculate the value Yj from the received signals, the base station 104 or 106 may send a message to the mobile station 100 containing the correct value for Yj.

At step 262, the first plurality of traffic channels x1, x2 and x3 generated by the first rake receiver 126 are weighted by the first plurality of complex weighting coefficients c1, c2 and c3 using the first weighting network 130. Further, the second plurality of traffic channels x'1, x'2 and x'3 generated by the second rake receiver 154 are weighted by the second plurality of complex weighting coefficients c'1, c'2 and c'3 using the second weighting network 158.

At step 263, the weighted signals produced by the first weighting network 130 and the second weighting network 158 are combined to produce a combined signal at line 200 using the combiner 138 of FIG. 1.

At step 268, the combined signal 200 is stored in a de-interleaver buffer in the de-interleaver 140 of FIG. 1.

At step 269, a determination is made if the de-interleaver buffer is filled. If the buffer is filled the flow continues to step 264. If the de-interleaver buffer is not filled, the flow returns to step 251.

At step 264, the combined signal 200 is de-interleaved to produce a de-interleaved signal at line 202 using the de-interleaver 140 of FIG. 1.

At step 265, the de-interleaved signal is decoded to produce a decoded signal at line 204 using the decoder 142 of FIG. 1.

At step 266, the decoded signal at line 204 is processed to produce an audio signal at line 206 for the speaker 146.

The method ends at step 267.

Figure 3:
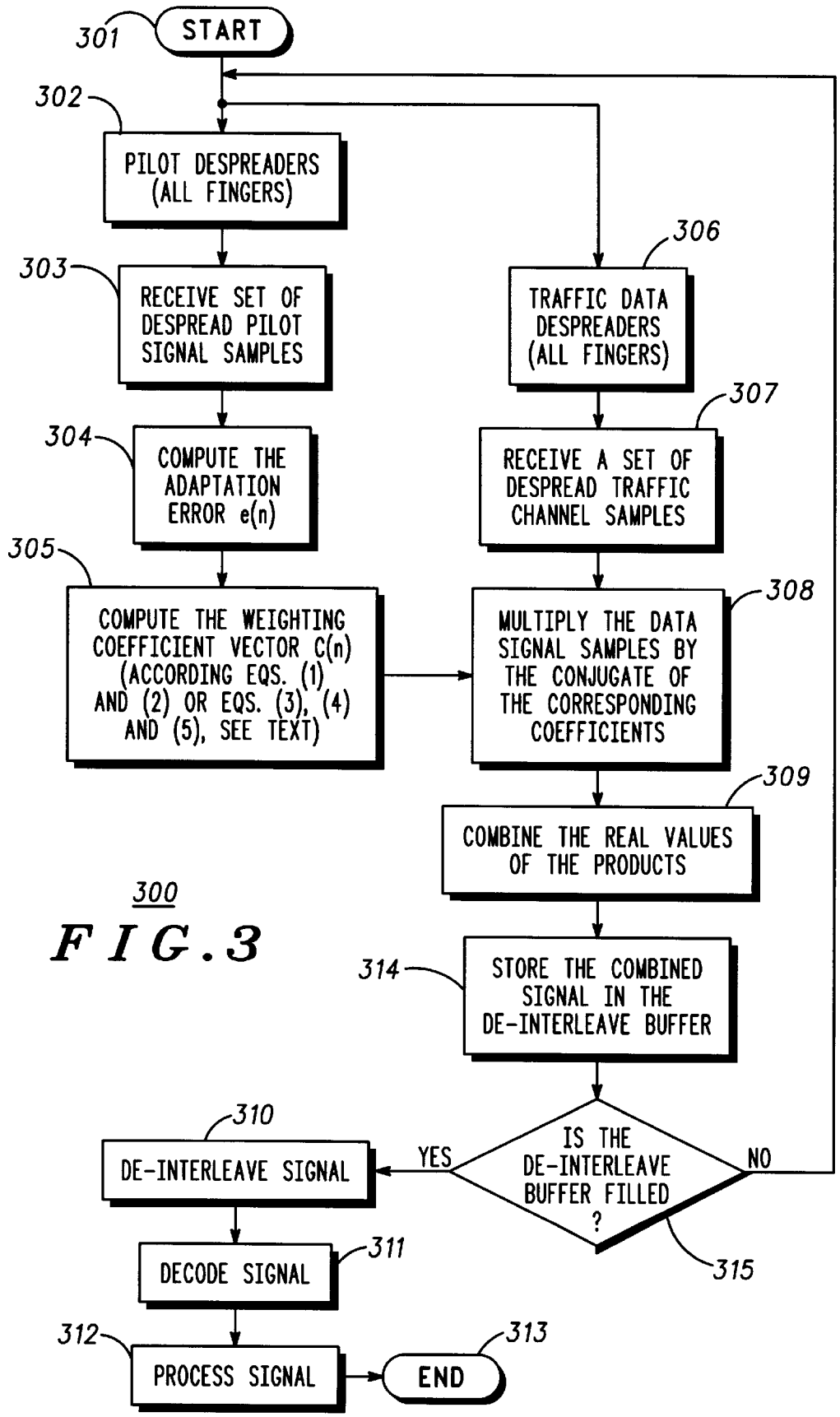
FIG. 3 illustrates a flowchart describing a second embodiment for determining weighting coefficients in the mobile station of FIG. 1.

FIG. 3 illustrates a flowchart 300 describing a second embodiment for determining the first plurality of weighting coefficients c1, c2 and c3 in the mobile station 100 of FIG. 1.

A problem of the weighting coefficient determination of the prior art is that there are times when adding the co-phased and weighted signals, each of which has an individually maximized signal to noise ratio (SNR), together does not maximize the signal-to-noise ratio. When interference is present, it may be more advantageous to cancel out the interfering signal rather than to maximize the SNR of individual signals. In the general case, the best decision may be to not rotate enough to completely cancel out an interferer, but only enough to maximize the SNR of the combined signal at line 200.

At step 301, the method starts.

At step 302, all fingers of the pilot signals are despread by the rake fingers 132, 134, 136, 160, 162, and 164 of FIG. 1.

At step 303, the despread pilot signals are received by the weighting coefficient determinator 128 and 156 of FIG. 1.

At step 306, all fingers of the traffic data are despread by the rake fingers 132, 134, 136, 160, 162, and 164 of FIG. 1.

At step 307, the despread traffic data are received by the weighting networks 130 and 138 of FIG. 1.

To explain how the fingers of the two antennas can be optimally combined according to the criterion of minimizing the mean square error (MSE) at the combiner output, let $x_i(k)$ and $p_i(k)$ denote the despread data and pilot output of the i-th finger receiving signal for the k-th symbol, respectively. The first, second and third fingers connect to the first antenna and the 4-th through 6-th fingers connect to the second antenna. Thus, the estimate of the Binary Phase Shift Keying (BPSK) data symbol at time n is given by the real part of:

$$\sum_i c_i(n) \times x_i(n),$$

where $c_i(n)$ are the combining coefficients. The real and imaginary parts of the above expression shall be used if we are decoding QPSK signal. The optimal channel coefficients should minimize the mean squared error at the combiner output. To achieve this, the channel coefficients should minimize the mean square value of:

$$A - Re\left[\sum_i c_i(n)p_i(n)\right],$$

where A is an arbitrary constant.

At step 305, a simple way to solve the coefficients $c_i$ is using least mean squares (LMS) algorithm as follows. If a least mean squares (LMS) algorithm is used in the implementation, Equations (1) and (2) below should be used for the calculation of the coefficient vector C(n). It is computed recursively as:

$$C(n)=C(n-1)+\Delta e(n)p^*(n) \qquad (1)$$

where C(n) is the coefficient vector, defined as $$C(n)=[c_1(n), \ldots c_M(n)]^t,$$

p(n) is the pilot signal vector, defined as $$p(n)=[p_1(n),p_2(n), \ldots ,p_6(n)]^t,$$

and e(n) is the adaptation error determined at step 304 and defined as:

$$e(n) = 1 - \sum_i [c_i(n) \times p_i(n)]. \qquad (2)$$

In these equations, "t" and "*" denote transpose and complex conjugate operations, respectively.

Alternatively, at step 305, when channel conditions change rapidly, e.g. for mobile applications, it is desirable for the adaptive algorithm to be able to track the rapid channel change. In such cases, more sophisticated algorithms such as the weighted least squares algorithms can be used to determine the optimal combining coefficients to yield a even better performance. Such an algorithm is a least squares (LS) algorithm. The LS algorithm is represented in Equations (3), (4) and (5) for calculating the coefficient vector C(n).

The weighting coefficient vector C(n) is computed by solving the matric equation:

$$c(n)R^{-1}(n-1)r(n), \qquad (3)$$

where $$R(n) = \sum_{k=0}^{L-1} w(k)p^*(n-k)p^t(n-k), \qquad (4)$$

and $$r(n) = A\sum_{k=0}^{L-1} w(k)p^*(n-k), \qquad (5)$$

where A is an arbitrary constant and L is the integration time.

In these equation, w(k) is a weighting function, which should be selected according to the fading characteristics of the channel. In most cases, we may simply let w(k)=1, without significant loss in performance. Such a window function is conventionally called a rectangular window. Another popular type of windows is the so called exponential window with w(k)=$b^k$, where 0<b≦1. Again, the n-th BPSK data symbol is computed according to:

$$\sum_i c_i(n) \times x_i(n),$$

as described above. The real and imaginary parts of the above expression shall be used if we are decoding QPSK signal.

It well known that for those familiar with the state of the art that, when an exponential or a rectangular windows is used, the coefficient vector C(n) can be computed recursively without solving the matrix equation.

At step 308, the first plurality of traffic channels x1, x2 and x3 generated by the first rake receiver 126 are weighted by the first plurality of complex weighting coefficients c1, c2 and c3 using the first weighting network 130. Further, the second plurality of traffic channels x'1, x'2 and x'3 are generated by the second rake receiver 154 are weighted by the second plurality of complex weighting coefficients c'1, c'2 and c'3 using the second weighting network 158.

At step 309, the weighted signal produced by the first weighting network 130 and the second weighting network 158 are combined to produce a combined signal at line 200 using the combiner 138 of FIG. 1.

At step 314, the combined signal 200 is stored in a de-interleaver buffer in the de-interleaver 140 of FIG. 1.

At step 315, a determination is made if the de-interleaver buffer is filled. If the buffer is filled the flow continues to step 310. If the de-interleaver buffer is not filled, the flow returns to step 301.

At step 310, the combined signal 200 is de-interleaved to produce a de-interleaved signal at line 202 using the de-interleaver 140 of FIG. 1.

At step 311, the de-interleaved signal is decoded to produce a decoded signal at line 204 using the decoder 142 of FIG. 1.

At step 312, the decoded signal at line 204 is processed to produce a processed signal at line 206 for the speaker 146.

At step 313, the method ends.

Although the first and second embodiments are described with reference to a CDMA mobile station, they may also be implemented in a base station as well. The first and second embodiments would be particularly well suited for base stations in which the reverse channel has a structure similar to the forward channel as specified by the IS-95 Standard, or when the reverse channel has few interferers.

What is claimed is:

1. A method for adaptively adjusting complex weighting coefficients for a first plurality of complex received signals in a code division multiple access (CDMA) radio receiver, the method comprising the steps of:

receiving a first representation of a desired RF signal;

generating a first plurality of complex pilot signals corresponding to the first plurality of complex received signals responsive to receiving the first representation of the desired RF signal; and determining each of a first plurality of complex weighting coefficients for each of the first plurality of complex received signals, respectively, responsive to more than one of the first plurality of complex pilot signals.

2. A method according to claim 1 further comprising the steps of:

receiving a second representation of a desired RF signal;

generating a second plurality of complex pilot signals corresponding to a second plurality of complex received signals responsive to receiving the second representation of the desired RF signal; and determining each of a second plurality of complex weighting coefficients for each of the second plurality of complex received signals, respectively, responsive to more than one of the second plurality of complex pilot signals.

3. A method according to claim 1 further comprising the steps of:

smoothing each of the first plurality of complex pilot signals.

4. A method according to claim 1 wherein each the first plurality of complex weighting coefficients is determined using a least mean squares algorithm.

5. A method according to claim 4 wherein the least mean squares algorithm determines the first plurality of complex weighting coefficients as follows:

$$C(n)=C(n-1)+\Delta e(n)p^*(n),$$

wherein C(n) is a complex weighting coefficient vector, defined as:

$$C(n)=\{c_1(n), \ldots c_M(n)\}^t,$$

wherein p(n) is a complex pilot signal vector, defined as:

$$p(n)=\{p_1(n), p_2(n), \ldots, p_6(n)\}^t, \text{ and}$$

wherein e(n) is an adaptation error defined as:

$$e(n) = 1 - \sum_i \{c_i(n) \times p_i(n)\},$$

wherein "t" and "*" denote transpose and complex conjugate operations, respectively.

6. A method according to claim 1 wherein each the first plurality of complex weighting coefficients is determined using a least squares algorithm.

7. A method according to claim 6 wherein the least squares algorithm determines the first plurality of complex weighting coefficients as follows:

$$C(n)=R^{-1}(n-1)r(n),$$

wherein C(n) is a complex weighting coefficient vector defined as:

$$C(n)=\{c_1(n), \ldots c_M(n)\}^t,$$

wherein R(n) is an autocorrelation matrix of p(n) defined as:

$$R(n) = \sum_{k=0}^{L-1} w(k)p^*(n-k)p^t(n-k),$$

wherein r(n) is an average of p(n) defined as:

$$r(n) = A \sum_{k=0}^{L-1} w(k)p^*(n-k),$$

wherein p(n) is a complex pilot signal vector defined as:

$$p(n)=\{p_1(n), p_2(n), \ldots, p_6(n)\}^t,$$

wherein A is an arbitrary constant,
wherein L is an integration time,
wherein w(k) is a weighting function indicative of characteristics of a radio channel, and
wherein "t" and "*" denote transpose and complex conjugate operations, respectively.

8. A method for adaptively adjusting complex weighting coefficients in for a first plurality of complex received signals a code division multiple access (CDMA) radio receiver, the method comprising the steps of:
receiving a first and a second representation of a desired RF signal;
generating a first and a second plurality of complex pilot signals corrresponding to the first and a second plurality of complex received signals, respectively, responsive to receiving the first and the second representation of the desired RF signal, respectively; and
determining each of a first plurality of complex weighting coefficients for each of the first plurality of complex received signals responsive to more than one of the first and the second plurality of complex pilot signals.

9. A method according to claim 8 further comprising the steps of:
smoothing each of the first and the second plurality of complex pilot signals.

10. A method according to claim 8 wherein each the first and the second plurality of complex weighting coefficients are determined using a least mean squares algorithm.

11. A method according to claim 10 wherein the least mean squares algorithm determines the first and the second plurality of complex weighting coefficients as follows:

$$C(n)=C(n-1)+\Delta e(n)p^*(n),$$

wherein C(n) is a complex weighting coefficient vector, defined as:

$$C(n)=\{c_1(n), \ldots c_M(n)\}^t,$$

wherein p(n) is a complex pilot signal vector, defined as:

$$p(n)=\{p_1(n), p_2(n), \ldots, p_6(n)\}^t, \text{ and}$$

wherein e(n) is an adaptation error defined as:

$$e(n) = 1 - \sum_i \{c_i(n) \times p_i(n)\},$$

wherein "t" and "*" denote transpose and complex conjugate operations, respectively.

12. A method according to claim 8 wherein each the first and the second plurality of complex weighting coefficients is determined using a least squares algorithm.

13. A method according to claim 12 wherein the least squares algorithm determines the first and the second plurality of complex weighting coefficients as follows:

$$C(n)=R^{-1}(n-1)r(n),$$

wherein C(n) is a complex weighting coefficient vector defined as:

$$C(n)=\{c_1(n), \ldots c_M(n)\}^t,$$

wherein R(n) is an autocorrelation matrix of p(n) defined as:

$$R(n) = \sum_{k=0}^{L-1} w(k)p^*(n-k)p^t(n-k),$$

wherein r(n) is an average of p(n) defined as:

$$r(n) = A \sum_{k=0}^{L-1} w(k)p^*(n-k),$$

wherein p(n) is a complex pilot signal vector defined as:

$$p(n)=\{p_1(n), p_2(n), \ldots, p_6(n)\}^t,$$

wherein A is an arbitrary constant,
wherein L is an integration time,
wherein w(k) is a weighting function indicative of characteristics of a radio channel, and
wherein "t" and "*" denote transpose and complex conjugate operations, respectively.

14. A method for operating a code division multiple access (CDMA) radio receiver comprising the steps of:
receiving a first representation of a desired RF signal;
generating a first plurality of complex data signals responsive to the first representation of the desired RF signal;
generating a first plurality of complex pilot signals corresponding to the first plurality of complex data signals responsive to the first representation of the desired RF signal; and
determining each of a first plurality of complex weighting coefficients for the first plurality of complex data signals responsive to more than one of the first plurality of complex pilot signals;
weighting the first plurality of complex data signals responsive to the first plurality of complex weighting coefficients to generate a first plurality of complex weighted received signals;
combining the first plurality of complex weighted received signals to produce a combined signal;
de-interleaving the combined signal to produce a de-interleaved signal;
decoding the de-interleaved signal to produce a decoded signal; and
processing the decoded signal to produce a recovered signal.

15. A method according to claim 14 further comprising the steps of:
receiving a second representation of a desired RF signal;
generating a second plurality of complex pilot signals corresponding to a second plurality of complex data signals responsive to the second representation of the desired RF signal; and
determining each of a second plurality of complex weighting coefficients for the second plurality of complex data signals responsive to more than one of the second plurality of complex pilot signals.

16. A method according to claim 14 further comprising the steps of:
smoothing each of the first plurality of complex pilot signals.

17. A method according to claim 14 wherein each the first plurality of complex weighting coefficients is determined using a least mean squares algorithm.

18. A method according to claim 17 wherein the least mean squares algorithm determines the first plurality of complex weighting coefficients as follows:

$$C(n)=C(n-1)+\Delta e(n)p^*(n),$$

wherein C(n) is a complex weighting coefficient vector, defined as:

$$C(n)=\{c_1(n), \ldots c_M(n)\}^t,$$

wherein p(n) is a complex pilot signal vector, defined as:

$$p(n)=\{p_1(n), p_2(n), \ldots, p_6(n)\}^t, \text{ and}$$

wherein e(n) is an adaptation error defined as:

$$e(n) = 1 - \sum_i \{c_i(n) \times p_i(n)\},$$

wherein "t" and "*" denote transpose and complex conjugate operations, respectively.

19. A method according to claim 14 wherein each the first plurality of complex weighting coefficients is determined using a least squares algorithm.

20. A method according to claim 19 wherein the least squares algorithm determines the first plurality of complex weighting coefficients as follows:

$$C(n)=R^{-1}(n-1)r(n),$$

wherein C(n) is a complex weighting coefficient vector defined as:

$$C(n)=\{c_1(n), \ldots c_M(n)\},$$

wherein R(n) is an autocorrelation matrix of p(n) defined as:

$$R(n) = \sum_{k=0}^{L-1} w(k)p^*(n-k)p^t(n-k),$$

wherein r(n) is an average of p(n) defined as:

$$r(n) = A \sum_{k=0}^{L-1} w(k)p^*(n-k),$$

wherein p(n) is a complex pilot signal vector defined as:

$$p(n)=\{p_1(n), p_2(n), \ldots, p_6(n)\}^t,$$

wherein A is an arbitrary constant, wherein L is an integration time, wherein w(k) is a weighting function indicative of characteristics of a radio channel, and wherein "t" and "*" denote transpose and complex conjugate operations, respectively.

* * * * *